US010897845B2

(12) United States Patent
Walker et al.

(10) Patent No.: US 10,897,845 B2
(45) Date of Patent: Jan. 26, 2021

(54) CUTTER HOUSING ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventors: Christopher Todd Walker, Hillsborough, NC (US); Robert A. Recher, Mebane, NC (US); Shivang Desai, Carrboro, NC (US); Teegan L. Kelly, Burlington, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 16/259,589

(22) Filed: Jan. 28, 2019

(65) Prior Publication Data

US 2020/0236849 A1 Jul. 30, 2020

(51) Int. Cl.

| | |
|---|---|
| ***A01D 34/71*** | (2006.01) |
| ***A01D 34/00*** | (2006.01) |
| ***A01D 34/81*** | (2006.01) |
| ***A01D 43/08*** | (2006.01) |
| *A01D 101/00* | (2006.01) |

(52) U.S. Cl.

CPC .......... *A01D 34/71* (2013.01); *A01D 34/005* (2013.01); *A01D 34/81* (2013.01); *A01D 43/086* (2013.01); *A01D 2101/00* (2013.01)

(58) Field of Classification Search

CPC ...................................................... A01D 34/71

See application file for complete search history.

(56) References Cited

U.S. PATENT DOCUMENTS

| | | | | |
|---|---|---|---|---|
| 3,893,284 | A | 7/1975 | Thon et al. | |
| 4,312,176 | A | 1/1982 | Bollinger et al. | |
| 6,609,358 | B1 | 8/2003 | Schmidt et al. | |
| 6,854,253 | B2 | 2/2005 | Dickey | |
| 6,874,309 | B1 * | 4/2005 | Bellis, Jr. ............ | A01D 42/005 56/320.2 |
| 6,910,324 | B2 | 6/2005 | Kakuk | |
| 7,174,700 | B2 | 2/2007 | Chenevert et al. | |
| 7,249,450 | B2 | 7/2007 | Iida et al. | |
| 7,305,813 | B2 * | 12/2007 | Plouraboue ........... | A01D 34/81 56/320.2 |

(Continued)

FOREIGN PATENT DOCUMENTS

DE 202014007541 U1 1/2015

*Primary Examiner* — Robert E Pezzuto

*Assistant Examiner* — Madeline Ivy Runco

(74) *Attorney, Agent, or Firm* — Kenealy Vaidya LLP

(57) ABSTRACT

Various types of lawnmowers are disclosed that include a cutter housing having a chamber wall and a discharge opening therein. A mulch gate can be provided with an interior scroll-shaped face and can be pivotably attached to the cutter housing so as to be movable between an opened gate position and a closed position. In the opened position, the mulch gate is positioned such that the discharge opening is opened to an exterior of the lawnmower to allow clippings to pass therethrough and out of the lawnmower. In the closed position the mulch gate closes the discharge opening to provide a mulch mode in which clippings remain in the cutter housing for added cutting by the lawnmower blade. When the mulch gate is in the closed gate position, the interior scroll-shaped face of the mulch gate can be substantially continuous with a wall interior surface of the chamber wall.

20 Claims, 8 Drawing Sheets

(56) References Cited

U.S. PATENT DOCUMENTS

| | | | | |
|---|---|---|---|---|
| 7,367,174 | B2 | 5/2008 | Grimwade | |
| 7,594,379 | B2 | 9/2009 | Nicholson et al. | |
| 7,624,998 | B2 | 12/2009 | Barlow et al. | |
| 7,677,022 | B2 | 3/2010 | Chenevert et al. | |
| 7,805,920 | B2 | 10/2010 | Hurst et al. | |
| 8,028,508 | B2 | 10/2011 | Imanishi et al. | |
| 8,132,396 | B2 | 3/2012 | Minami et al. | |
| 8,950,167 | B2 | 2/2015 | Moroi et al. | |
| 9,414,539 | B2 | 8/2016 | Lahey et al. | |
| 9,485,911 | B2 * | 11/2016 | Thorman | A01D 42/005 |
| 9,750,186 | B2 | 9/2017 | Hurst et al. | |
| 2004/0168424 | A1 * | 9/2004 | Baumann | A01D 34/71 56/320.1 |

* cited by examiner 58
59
60/59
63
67
75/59
70
77
184
67/64
62
69
66/64
66
79
183
65/64
68
61
65
73
71
100
65/64
73
72
72
185
92
80

96
95
100
97
101
98
100
93
124
121
151
94
102
103
99
95
105
104
96
101
102
124
121
92

164
166
160
166
74
75
167
174
171
168
173
172
150
162
163/
165
151
57
152
103
80
92
93
91
111
185
142
140
143
141
144
152
120
134
141

CUTTER HOUSING ASSEMBLY FOR A LAWNMOWER, LAWNMOWER HAVING SAME, AND CONVERTIBLE LAWNMOWER

BACKGROUND

Lawnmowers can be configured as garden tractors, riding mowers, and walk-behind mowers. Some walk-behind mowers can include a prime mover mounted to the deck of the lawnmower. Mower decks associated with garden tractors, riding mowers and other walk-behind mowers can be removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute or a discharge opening. Mulching mowers cut the clippings into fine particles and blow the clippings back into the lawn. Discharge mowers can either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching systems in which one or more movable components can be moved into any one of a plurality of positions between the mulching position and the discharging position such that some of the clippings are mulched and some of the clippings are directly discharged without mulching, via the discharge chute, into a collection bag or onto the ground.

SUMMARY

Some embodiments of the disclosed subject matter are directed to a cutter housing assembly for a lawnmower that includes a cutter housing having a chamber wall and a discharge opening. The chamber wall can include a wall interior surface. A gate assembly can include a mulch gate provided with an interior scroll-shaped face. The mulch gate can be pivotably attached to the cutter housing so as to be movable between (a) an opened gate position in which the mulch gate is positioned such that the discharge opening is opened, and (b) a closed gate position in which the mulch gate is positioned such that the mulch gate closes the discharge opening to provide a mulch mode. When the mulch gate is in the closed gate position, the interior scroll-shaped face of the mulch gate can be continuous with the wall interior surface of the chamber wall.

Some embodiments are directed to a cutter housing assembly for a lawnmower in which a cutter housing can include at least one cutting chamber, a chamber wall extending along the cutting chamber, and a discharge opening. The chamber wall can have an arcuate shape. At least one blade can be rotatably supported in the cutting chamber about a blade axis. A gate assembly can include a mulch gate pivotably attached to the cutter housing so as to be movable between (a) an opened gate position in which the mulch gate is positioned such that the discharge opening is opened, and (b) a closed gate position in which the mulch gate is positioned such that the mulch gate closes the discharge opening to provide a mulch mode. The mulch gate can include a scroll wall that has an arcuate shape such that the scroll wall is substantially continuous with the chamber wall when the mulch gate is in the closed gate position. In the closed gate position, the interior scroll-shaped face, of the mulch gate, can be continuous with the wall interior surface of the chamber wall.

Still other embodiments of the disclosed subject matter can be directed to a lawnmower that includes a cutter housing assembly. The cutter housing assembly can include a cutter housing having a chamber wall, with a wall interior surface, provided with a discharge opening. At least one blade can be configured to rotate within the cutter housing about a blade axis. A gate assembly that includes a mulch gate can be provided with an interior scroll-shaped face. The mulch gate can be pivotably attached to the cutter housing so as to be movable between (a) an opened gate position in which the mulch gate is positioned such that the discharge opening is opened, and (b) a closed gate position in which the mulch gate is positioned such that the mulch gate closes the discharge opening to provide a mulch mode. In the closed gate position, the interior scroll-shaped face of the mulch gate is continuous with the wall interior surface of the chamber wall such that clippings remain in the cutter housing and are not discharged via the discharge opening.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Mulching assemblies are known that convert a lawnmower between a "discharge" mode and a "mulch" mode. Some mulching assemblies remain mounted in the cutter housing of the lawnmower and include many components, including different doors, levers, and rotating gears that allow conversion from a full mulching mode to a discharge mode. However, these many components can result in a labor-intensive assembly for manufacturing and/or for operation and maintenance. Thus, the manufacturing and operating cost for lawnmowers with automatic cutting/mulching conversion devices can be greater as compared to a lawnmower that includes a removable mulching conversion assembly. However, removal and installation processes for removable mulching conversion assemblies are typically inconvenient and time consuming. Thus, there is a need for an automatic mulching conversion assembly that can reduce manufacturing and operation cost and lessen or avoid any inconvenience perceived by the operator when converting the lawnmower between the discharge mode and the mulching mode.

In accordance with one aspect of the disclosure, an assembly is provided with a mulching door or gate that can rotate horizontally downward for converting the lawnmower from the discharge mode to the mulching mode. The mulching gate can be configured to obstruct or close a discharge opening in the cutter housing. The user can remotely actuate the mulching gate to move between the mulching mode position and the discharge mode position. The mulching gate can be used with a lawnmower or cutter housing that includes one blade, or more than one blade. The mulching gate can be implemented in a walk-behind lawnmower, in a cutter housing of a riding mower or in a cutter housing of a garden tractor.

The disclosed assembly can allow the user to change the cutting mode from all mulching to side discharge without the need for installing extra parts and in a smooth and simple operation requiring few parts. Conversion can also be accomplished without interrupting the cutting operation of the lawnmower.

Figure 1:
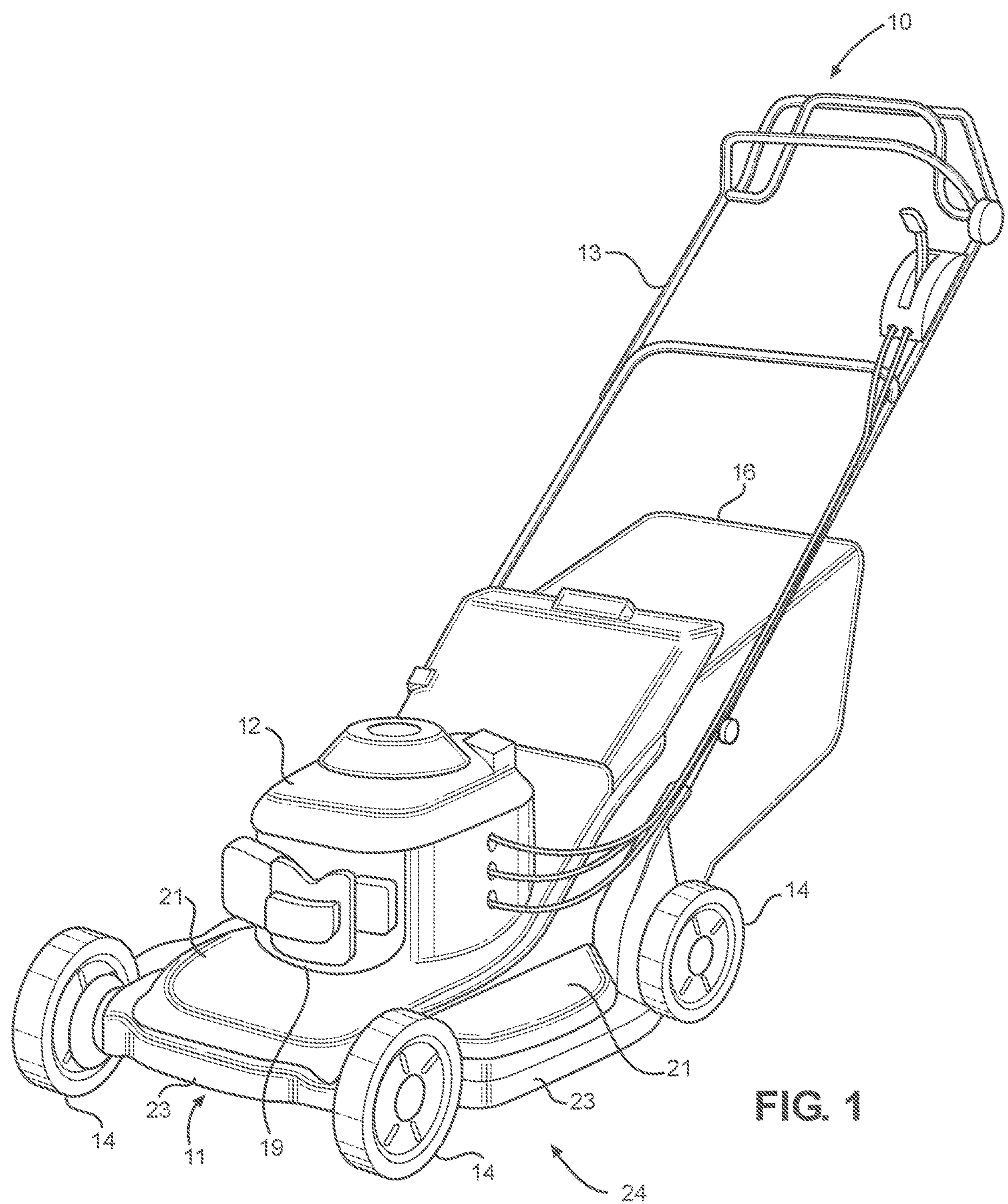
FIG. 1 is a perspective view of an embodiment of a lawnmower made in accordance with principles of the disclosed subject matter.
Figure 2:
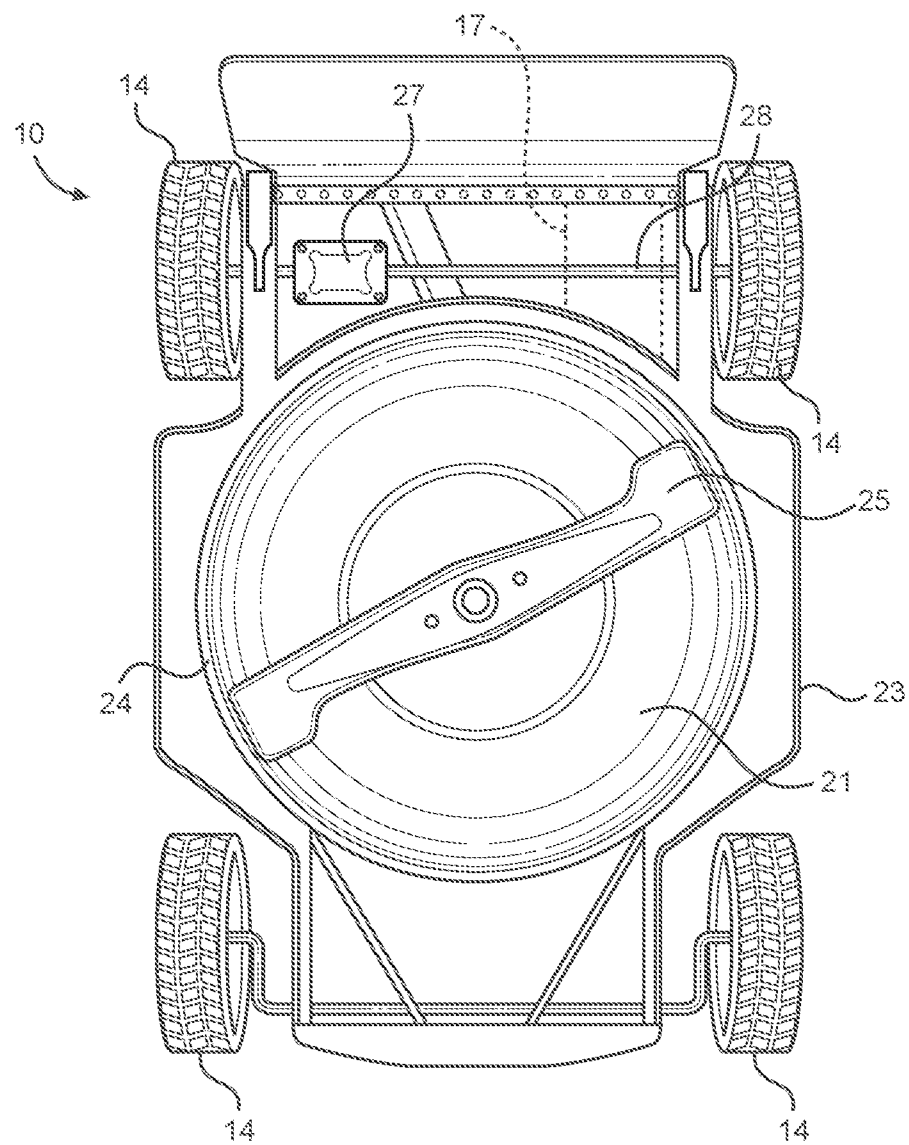
FIG. 2 is a bottom view of the lawnmower, with cutter housing, as shown in FIG. 1.

FIG. 1 is a perspective view of an exemplary lawnmower 10, and specifically a walk-behind lawnmower. FIG. 2 is a bottom view of the lawnmower of FIG. 1. The lawnmower 10 can include a cutter housing assembly that includes a cutter housing 11, a gate assembly described below with respect to an exemplary embodiment illustrated in FIGS. 5-9, and at least one blade 25 rotatably supported by the cutter housing 11. The cutter housing 11 can also be referred to as a deck or as a mower deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. The mounting portion 19 of the exemplary embodiment of FIG. 1 can surround an opening at a central portion of the cutter housing 11, and can include a plurality of mounting holes spaced around the opening. Referring to FIG. 2, the prime mover 12 can drive a driveshaft that supports at least one blade 25. The blade 25 can rotate in a cutting chamber 24 defined by the cutter housing 11 and opened toward the ground. In operation of the lawnmower, the prime mover 12 rotates the driveshaft, which, in turn, rotates the blade 25. As a result, the lawnmower 10 can perform a mowing operation on vegetation, such as to mow a lawn.

As shown in FIG. 1, the lawnmower 10 can include a steering handle 13 and a plurality of wheels 14. The steering handle 13 can be used by a user to operate the lawnmower 10 and guide the path of travel of the lawnmower 10. The steering handle 13 can include or be associated with various control mechanisms. Such control mechanisms can include speed controls for self-propelled lawnmowers. Such control mechanisms can include safety stop levers or bars, which the user must depress or hold to maintain the lawnmower in a running state. The wheels 14 of the lawnmower 10 can be of various shapes and sizes as desired. In a self-propelled lawnmower, the wheels 14 at the rear of the lawnmower 10 can be driven so as to propel the lawnmower 10.

The cutter housing 11 can also include a discharge chute 17 and the lawnmower 10 can include a collection bag 16. The discharge chute 17 can be located at the rear of the cutter housing 11 and adjacent to the wheel 14 at the right rear of the cutter housing 11, for example. The discharge chute 17 can be in communication with the cutting chamber 24 and oriented to discharge the vegetation clippings toward the side of the lawnmower 10 or toward the rear of the lawnmower 10. In the exemplary embodiment of FIG. 1, the discharge chute can discharge the clippings toward the rear of the lawnmower 10. When the lawnmower 10 is in a discharging mode, lawn clippings, for example, can be propelled from the cutting chamber 24, in which blade 25 spins and in which vegetation is cut by the spinning blade of the lawnmower 10 into the discharge opening and through a discharge chute. The clippings can pass through the discharge chute 17 and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute and onto the ground. Additionally, the lawnmower 10 can include a gearbox 27 that drives rear axle 28. The gearbox 27 can be mechanically and operatively connected to the prime mover 12 so as to provide power to the rear axle 28.

As shown in FIG. 1 and FIG. 2, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or being separated by a particular feature of the lawnmower, such as a distinct bend or ridge. The top wall 21 can also be integrally formed with the sidewall(s) 23. For example, the top wall 21 and the sidewall(s) 23 can be integrally formed of stamped or cast metal or of molded plastic construction. In the exemplary embodiment of FIG. 1, the cutter housing 11 can be stamped from a steel sheet.

Figure 3:
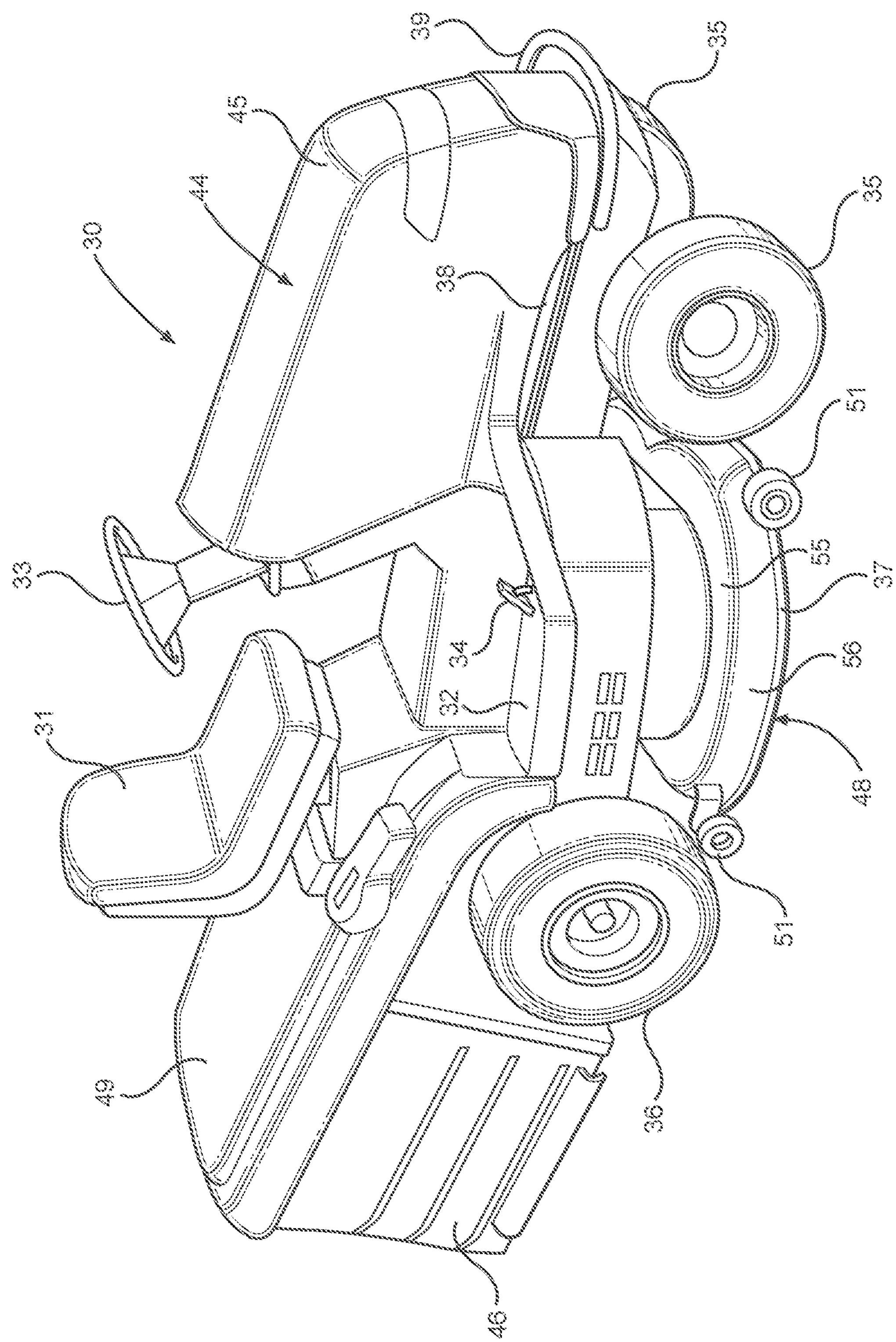
FIG. 3 is a perspective view of another embodiment of a lawnmower made in accordance with principles of the disclosed subject matter.

FIG. 3 is a perspective view of another embodiment of a lawnmower 30 in the form of a riding lawnmower or a garden tractor. The lawnmower 30 can support a human operator who rides on the lawnmower 30. The operator can be supported by a seat 31 and one or more foot supports 32 of the lawnmower. For example, the lawnmower 30 in the form of a garden tractor can be configured to perform tasks other than cutting vegetation by adding one or more implements such as but not limited to a rotary brush, a tiller, a snow blower, or a front-mounted blade or bucket. The lawnmower 30 in the form of a riding mower can also be configured exclusively for cutting vegetation. FIG. 3 illustrates the lawnmower 30 in the form of a garden tractor.

The operator can control movement of the lawnmower 30 on a lawn, terrain, or other surface. The operator can also control various aspects of movement of the lawnmower 30, including direction of travel and speed of travel. Control of movement of the lawnmower 30, by the operator, can be facilitated by a steering mechanism such as a steering wheel 33, one or more control pedals 34, and/or other control mechanisms. The steering wheel 33 can control turning of the front wheels 35 of the lawnmower 30. Accordingly, the operator can manipulate the steering wheel 33 to guide or control a path of travel of the lawnmower 30. The one or more control pedals 34 can be provided on or adjacent to the foot supports 32 of the lawnmower 30. For example, a control pedal 34 can be configured as an accelerator to provide control of travel speed of the lawnmower 30 and can also be associated with a clutch and transmission to control forward/reverse direction and speed ranges for the lawnmower 30.

The lawnmower 30 can include a pair of front wheels 35 and a pair of rear wheels 36. FIG. 3 shows three wheels and it should be understood that a fourth wheel (i.e., the second rear wheel, obstructed from view in FIG. 3) can be provided at the left rear of the lawnmower 30.

The lawnmower 30 can include a cutter housing assembly that includes a cutter housing 37, a gate assembly described below with respect to an exemplary embodiment illustrated in FIGS. 5-9, and a pair of blades 40, 41 rotatably supported by the cutter housing 37. The cutter housing 37 can also be referred to as a deck or as a mower deck or as a cutter deck of the lawnmower 30. The cutter housing 37 can be removably mounted to a frame of the lawnmower 30. In the exemplary embodiment of FIG. 4, the cutter housing 37 can support the pair of blades 40, 41. However, alternate embodiments of the cutter housing 37 can include any appropriate number of blades. For example, FIG. 5 shows an alternate embodiment of a cutter housing 58 for use with the lawnmower 30 that supports three blades 68, 69, 70.

Figure 4:
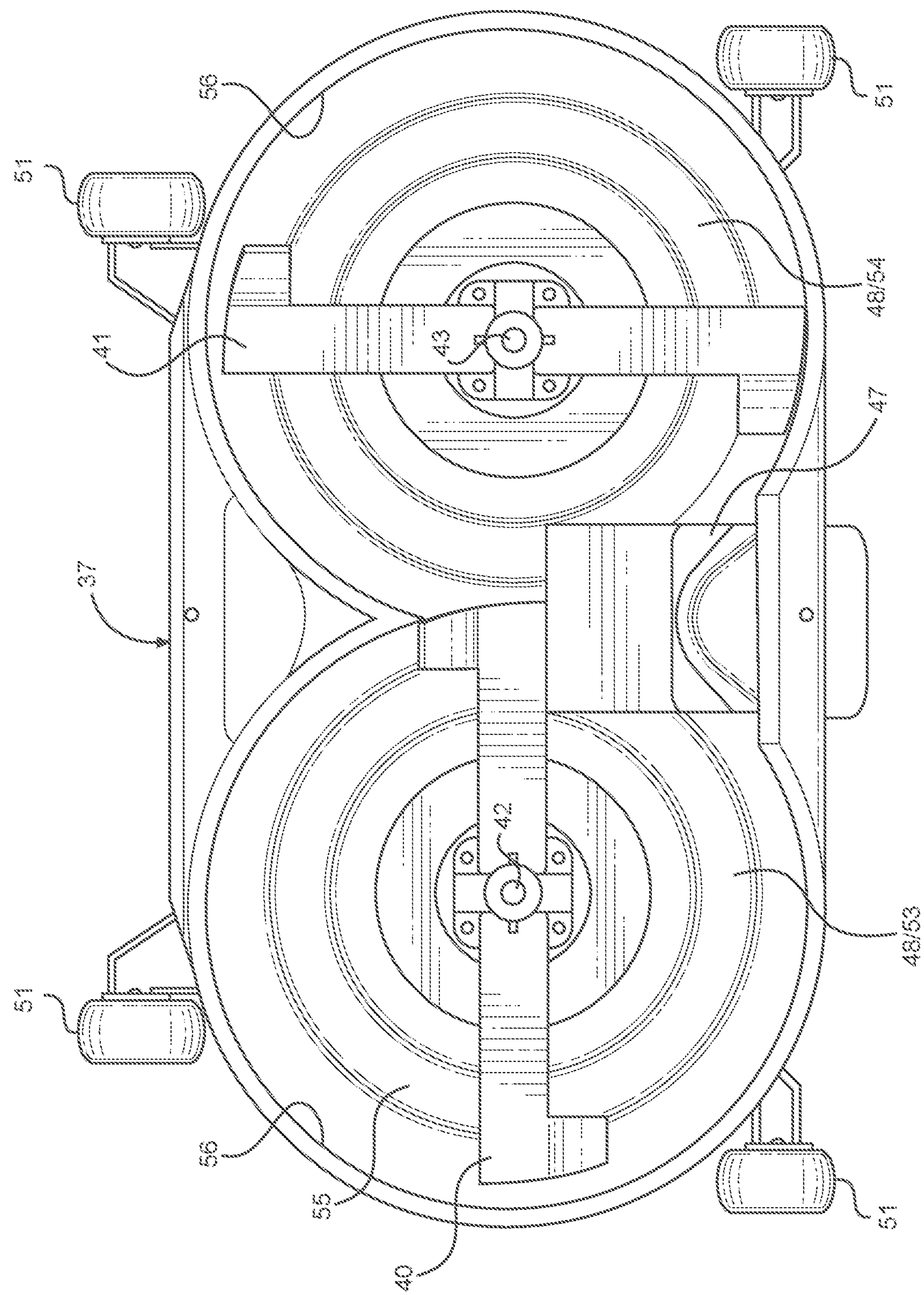
FIG. 4 is a bottom view of the lawnmower, with cutter housing with two blades, as shown in FIG. 3.
Figure 5:
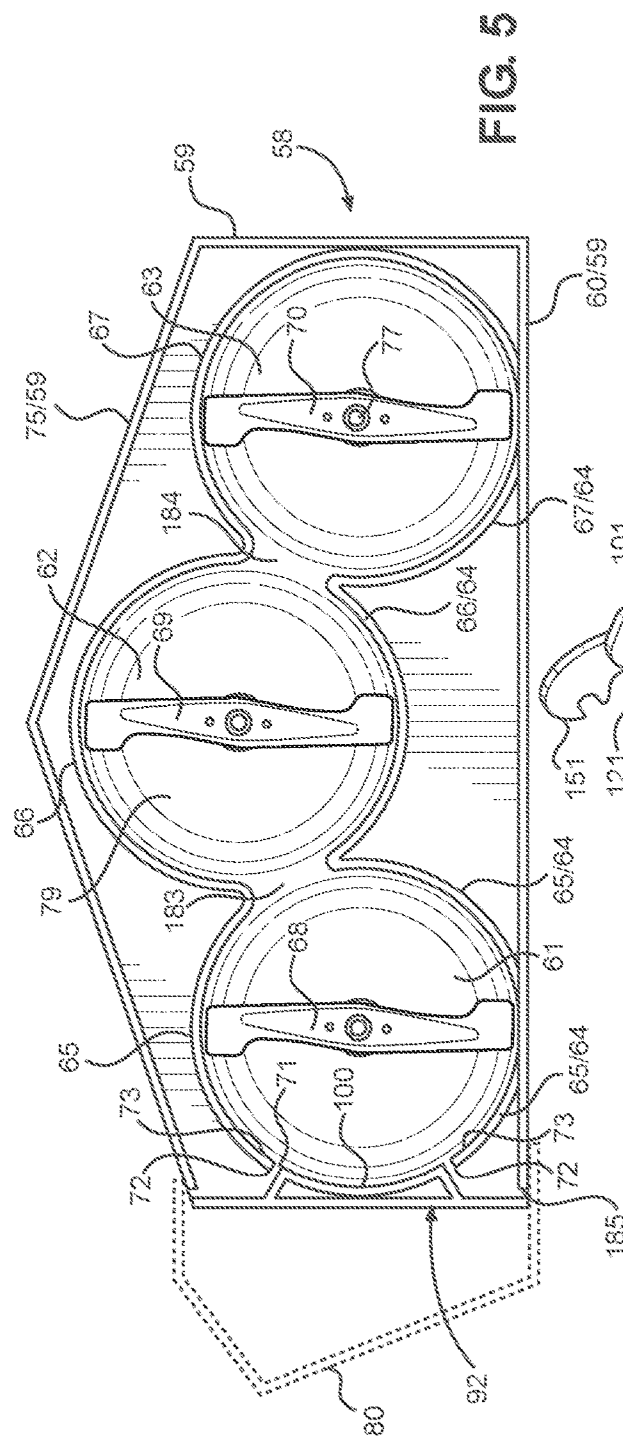
FIG. 5 is a bottom view of an embodiment of a cutter housing with three blades made in accordance with principles of the disclosed subject matter.

Referring to FIG. 4, the blades 40, 41 can rotate in a cutting chamber 48 defined by the cutter housing 37 and opened toward the ground. In operation of the lawnmower 30, the prime mover 38 can rotate a driveshaft that can be mechanically connected to the one or more blades 40, 41, such as by first driven shaft 42 and second driven shaft 43, so as to rotate the one or more blades. As a result, the lawnmower 30 can perform a mowing operation on vegetation, which can include or be in the form of a lawn.

Referring to FIG. 4, the prime mover 38 can be in the form of a gasoline engine or an electric motor. The prime mover 38 can also supply power for driving the one or more wheels 35, 36 of the lawnmower, as controlled by the operator. For example, the prime mover 38 can power the two rear wheels 36 of the lawnmower such that the two rear wheels 36 are the powered wheels.

Any appropriate power transmission mechanism can transfer power from the prime mover 38 to the driven wheel(s) such as but not limited to a fluid pump and hydrostatic motor system or a multiple ratio gear transmission system. The gear transmission system can be connected to the prime mover by one or more driveshaft(s), or by a belt and pulley system.

The lawnmower 30 can include a frame or chassis 39. The frame 39 can provide a main supporting structure of the lawnmower 30 to which various components of the lawnmower 30 are attached. The wheels 35, 36 can be attached to axles that in turn can be attached to the frame 39 of the lawnmower. The prime mover 38 can be attached to the frame 39 and mechanically connected to the powered wheels so as to propel the lawnmower 30.

As described above, the prime mover 38 can also drive the blades 40, 41 in the cutter housing 37, such as by using any appropriate blade drive assembly. For example, a belt and pulley system can be used to selectively transfer rotational motion from the prime mover 38 to the blades 40, 41. The belt and pulley system can include a driving pulley driven by the prime mover 38, a driven pulley driving a respective one of the blades 40, 41 and at least one belt wrapped around the pulleys. A movable idler pulley or tension arm can selectively add or remove tension on the belt such that belt selectively transfers rotational motion from the driving pulley to the driven pulleys.

The frame 39 of the lawnmower 30 can also support a body 44 of the lawnmower 30. The body 44 can provide an outer, finished surface that can cover the frame 39, prime mover 38, and other components or portions of components of the lawnmower 30. The body 44 can include a hood 45. The hood 45 can cover at least a portion of the prime mover 38. The foot support(s) 32, as described above, can be integrally formed and/or supported by the body 44 of the lawnmower 30.

The lawnmower 30 can also include a collection bag 46. The collection bag 46 can be supported by the frame 39 of the lawnmower. The collection bag 46 can be supported by rods or other structural supports that extend rearwardly from a portion of the frame 39 above or adjacent to the rear wheels 36. A discharge opening and/or passageway 47 can be provided to transfer clippings from a cutting chamber 48 to the collection bag 46 when the lawnmower 30 is in a discharge mode. The body 44 of the lawnmower 30 can include a collection bag cover 49 that is positioned over and/or covers the collection bag 46. Accordingly, the body 44 of the lawnmower 30, including the engine hood 45, collection bag cover 49, and other components of the body 44 can provide an aesthetically pleasing appearance to the lawnmower.

The lawnmower 30 can include a cutter housing lift assembly that controls height of the cutter housing 37. The height of the cutter housing 37 can be controlled so as to be positioned between a raised position and a lowered position. In the raised position, the cutter housing 37 with blades can be positioned so as to provide a "long cut" to a lawn. In the lowered position, the cutter housing 37 with blades can be positioned so as to provide a "short cut" into the lawn. Various interim positions, between the raised position and the lowered position, can be provided. The height of the cutter housing 37 can be controlled by the human operator riding on the lawnmower 30, such as by a lever, for example.

The cutter housing 37 can be provided with housing wheels or housing rollers 51. A housing roller 51 can be provided at or adjacent to a rear of the cutter housing 37. A housing roller 51 can be provided at or adjacent to a front and a rear of the cutter housing 37. Housing rollers 51 can be provided on both the left and right sides of the cutter housing. The housing rollers 51 can limit how close the cutter housing 37 or particular portion of the cutter housing 37 gets into the lawn. Illustratively, if the lawnmower passes over a bump or high point in a lawn, the housing wheel(s) 51 can engage the bump so as to prevent "scalping" of the lawn and/or so as to prevent the blades of the lawnmower 30 from engaging with the earth of the lawn. The particular position and number of the housing rollers or housing wheels 51 can be varied as desired.

The wheels of the lawnmower 30, including the front wheels 35 and the rear wheels 36 can be of various shapes and sizes as desired. For example, in the situation of a rear-wheel drive lawnmower, the rear wheels 36 can be of a particular shape and size so as to be conducive to driving or propelling the lawnmower 30 along a lawn or other terrain, in conjunction with supporting the lawnmower 30. The front wheels 35 can be of a particular shape and size so as to be conducive to steering the lawnmower 30, in conjunction with supporting the lawnmower 30.

FIG. 4 is a bottom view of a cutter housing 37 the same as or similar to the cutter housing 37 shown in FIG. 3, in accordance with at least one embodiment of the disclosure. The cutting chamber 48 can include a first cutting chamber 53 and a second cutting chamber 54. In other arrangements, additional cutting chambers can be provided. The first cutting chamber 53 houses a first blade 40. The second cutting chamber 54 houses a second blade 41. The first blade 40 and the second blade 41 can be driven, so as to cut grass or other vegetation, as described above.

FIG. 4 provides an arrangement that illustrates a synchronous cutter housing layout. In a synchronous cutter housing layout, rotation of the first blade 40 is synchronized with rotation of the second blade 41. This synchronization of the two cutting blades 40, 41 can be performed by mechanically connecting the first blade 40 to the second blade 41, such as by utilizing a timing belt or a shaft and gear drive or other similar arrangement that limits or prevents rotation of one the blades 40, 41 relative to the other of the blades 40, 41. In the illustrated synchronous cutter housing layout, the cutting circle in which the first blade 40 rotates can intersect the cutting circle in which the second blade 41 rotates such that first blade 40 enters the cutting circle of the second blade 41 and the second blade 41 enters the cutting circle of the first blade 41. Accordingly, it can be advantageous to synchronize rotation of the first blade 40 with rotation of the second blade 41 so that the two blades 40, 41 can avoid a collision or interference with each other. Such intersection of the cutting circles of the two blades 40, 41 can be desired so as to provide effective cutting coverage of the lawn. In other words, such intersection of the cutting circles of the two blades 40, 41 can be desirable so that vegetation between the centers of the two blades 40, 41 is cut.

As shown in FIG. 4, the cutter housing 37 includes a top wall 55 and one or more sidewalls 56 that extend downward from the top wall 55 and toward the ground. The top wall 55 can be demarcated from the sidewall(s) 56 by the top wall 55 having a substantially horizontal disposition and the sidewalls 56 having a substantially vertical disposition. The top wall 55 can be demarcated from the sidewall(s) 56 by being constructed of respective parts and/or being separated by a particular feature of the lawnmower 30, such as a distinct bend or ridge in the cutter housing. The top wall 55 can be integrally formed with the sidewall(s) 56. The top wall 55 and the sidewall(s) 56 can form at least portions of the first cutting chamber 53 and the second cutting chamber 54 shown in FIG. 4. For example, the top wall 55 and the sidewall(s) 56 can be integrally formed of stamped or cast metal or of molded plastic construction.

The cutter housing 37 shown in FIG. 4 can include a rear discharge layout. That is, a discharge opening 47 can be provided at the rear of the cutter housing 37. The discharge opening 47 can be in communication with each of the first and second cutting chambers 53, 54. In operation, lawn clippings can be ejected from the first cutting chamber 53 and/or the second cutting chamber 54 through the discharge opening 47 and into a passageway that communicates with the collection bag 46. Accordingly, lawn clippings can be ejected from the cutting chambers 48, including the first cutting chamber 53 and the second cutting chamber 54, and passed to the collection bag. The collection bag 46 can then be emptied at a point in time as may be desired. The collection bag 46 can be emptied when the operator of the lawnmower 30 determines that the collection bag 46 is full, for example. It is appreciated that the size and particular positioning of the discharge opening 47 can be varied as may be desired.

FIGS. 5-9 illustrate an alternate embodiment of a cutter housing assembly 57 including a cutter housing 58, a gate assembly 91 and a plurality of blades 68, 69, 70. The exemplary cutter housing assembly 57 is usable with the lawnmower 30 configured as either a riding mower or as a garden tractor, or usable with a walk-behind lawnmower. As will be described in further detail below, the exemplary gate assembly 91 can include a mulch gate 92 that can selectively obstruct or close the discharge opening 71 of the cutter housing 58 in order to convert the cutter housing 58 between the mulching mode and the discharge mode. The gate assembly 91 can be configured for use with the cutter housing 11 of FIGS. 1 and 2 or the cutter housing of FIGS. 3 and 4.

FIG. 5 is a bottom view of the cutter housing 58 and shows additional features of the cutter housing assembly 57. The cutter housing 58 can also be referred to as a deck or as a mower deck or as a cutter deck of the lawnmower 30. The cutter housing 58 can be removably mounted to a frame of the lawnmower 30. The cutter housing 58 is shown as supporting three blades 68, 69, 70, but can include any appropriate number of blades as deemed appropriate for a particular application.

The cutter housing 58 can include a first cutting chamber 61, a second cutting chamber 62, and a third cutting chamber 63. The cutting chambers 61, 62, 63 can be demarcated or defined by side walls 59 and/or chamber walls 64. The sidewalls 59 can include a rear side wall 60 and a front wall 75, as well as a top wall 74. The top wall 74 can include an underside 79. The chamber walls 64 can include a first chamber wall 65, a second chamber wall 66, and a third chamber wall 67. The first chamber wall 65 can serve to demarcate, at least in part, the first cutting chamber 61. The second chamber wall 66 can serve to demarcate, at least in part, the second cutting chamber 62. The third chamber wall 67 can serve to demarcate, at least in part, the third cutting chamber 63.

Figure 7:
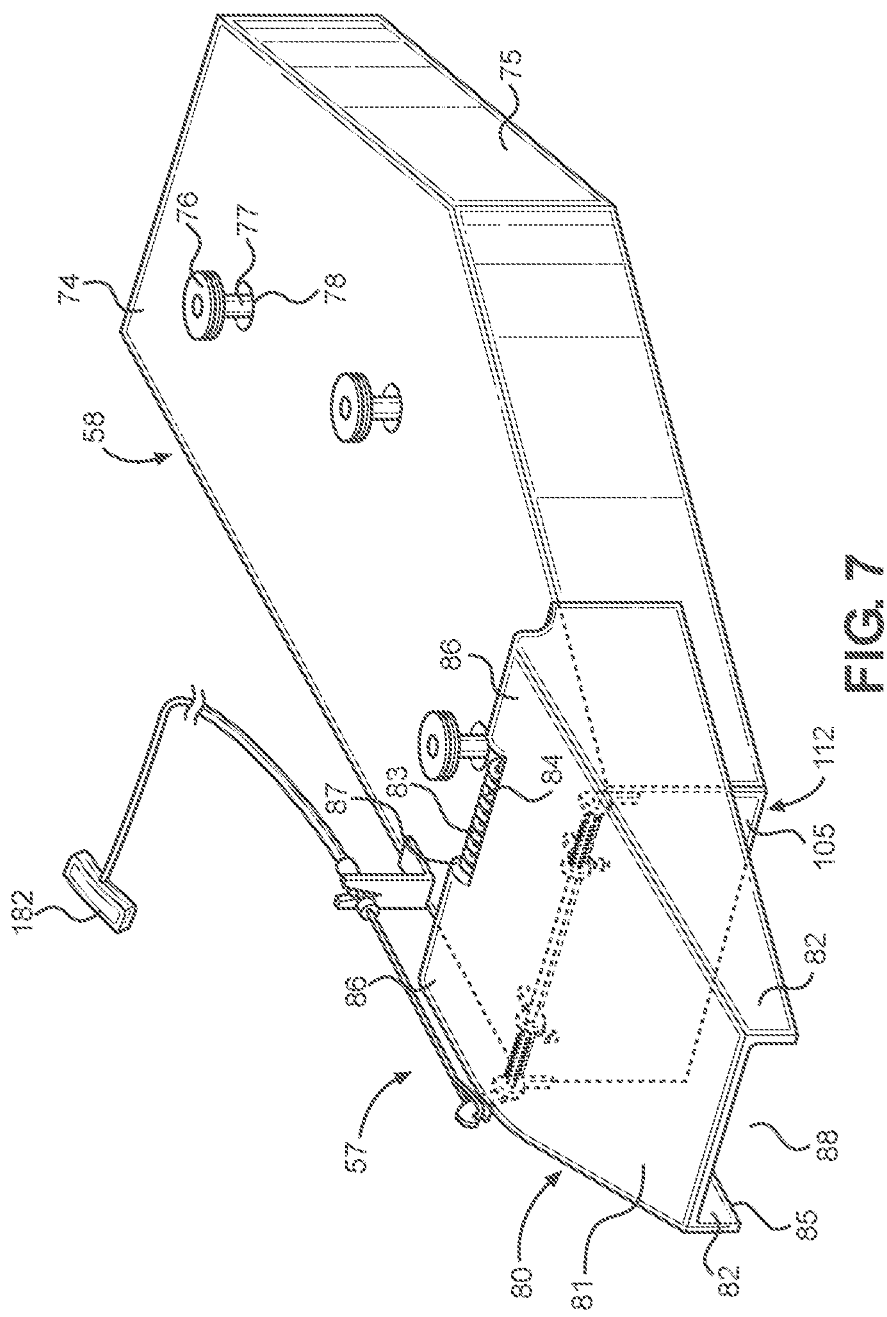
FIG. 7 is a perspective view of a cutter housing assembly, made in accordance with principles of the disclosed subject matter.

Each of the cutting chambers 61, 62, 63 can be provided with a respective rotating blade 68, 69, and 70. The rotating blades can include a first blade 68, a second blade 69, and a third blade 70. Referring to FIG. 7, each of the rotating blades 68, 69, 70 can be mounted on and driven by a respective driven shaft 77 with associated pulley 76. The driven shaft 77 can be pivotably supported by a bearing aperture 78 in the top wall 74 of the cutter housing 58. Each of the driven shafts 77 can be mechanically powered by the prime mover 38 of the lawnmower 30, in conjunction with a mechanical power transfer arrangement, such as but not limited to the pulley and belt system described above.

The cutter housing 58 of FIG. 5 is provided, as illustrated, with a side discharge layout. The side discharge layout can include a discharge opening 71 on the left-hand side as shown in FIG. 5, i.e. with the cutter housing upside down. However, the cutter housing 58 can be configured as a rear discharge cutter housing such as the exemplary cutter housing 11 of FIGS. 1 and 2, or the exemplary cutting housing 37 of FIGS. 3 and 4.

A mulch gate 92 can selectively obstruct or close the discharge opening 71 of the cutter housing 58 in order to convert the cutter housing 58 between the mulching mode and the discharge mode. FIG. 5 shows the mulch gate 92 in a closed gate position in which the mulch gate 92 closes or obstructs the discharge opening 71 and places the cutter housing 58 in the mulching mode.

The first chamber wall 65 and the second chamber wall 66 can include a first common opening 183. The first common opening 183 places the second cutting chamber 62 in communication with the first cutting chamber 61 (i.e., air and clippings can freely move between the first chamber and the second chamber). The second chamber wall 66 and the third chamber wall 67 can include a second common opening 184. The second common opening 184 places the third cutting chamber 63 in communication with the second cutting chamber 62. As a result, lawn clippings can be propelled, due to the airflow within the cutter housing 58, along the front of the chamber walls 65, 66, 67 and towards the discharge opening 71 where the lawn clippings can exit the discharge opening 71 when the mulch gate 92 does not obstruct or close the discharge opening 71.

The cutter housing 58 of FIG. 5 illustrates an asynchronous cutter housing layout of a mower deck. In such arrangement, the center blade 69 can be positioned, in a longitudinal direction of the lawnmower 30, in front of both of the outboard blades 68, 70. Thus, in the arrangement there may be a path of the cutting circle of the center blade 69 that overlaps the path of the cutting circle for each of the outboard blades 68, 70 as the lawnmower 30 traverses the lawn or terrain. However, because the center blade 69 is positioned in front of the outboard blades 68, 70 the blades do not interfere with each other in rotation. Accordingly, in such an arrangement synchronizing the rotation of the blades 68, 69, 70 relative to each other can be avoided, thereby simplifying the blade drive assembly as compared to the exemplary cutter housing 37 of FIGS. 3 and 4.

The disclosed lawnmowers can include a cutter housing lift assembly that controls height of the cutter housing relative to the ground or terrain that is traversed. The height of the cutter housing 58 can be controlled so as to be positioned between a raised position and a lowered position, as well as positioned in interim positions between the raised position and the lowered position. The height of the cutter housing 58 can be controlled by a lever that is manipulated by the operator of the particular lawnmower.

FIG. 5 also shows a mulch gate 92 connected to the cutter housing 58. The cutter housing 58 can include one or more chamber walls 64 having a wall interior surface 73. In the example of FIG. 5, the first chamber wall 65 includes the wall interior surface 73. The discharge opening 71 can, for example, pass through the first chamber wall 65 at a location that is adjacent a side of the cutter housing 58. The mulch gate 92 can selectively close (or obstruct) and open the discharge opening 71 in order to provide a mulching mode and a discharge mode, respectively, for the lawnmower 30.

Figure 6:
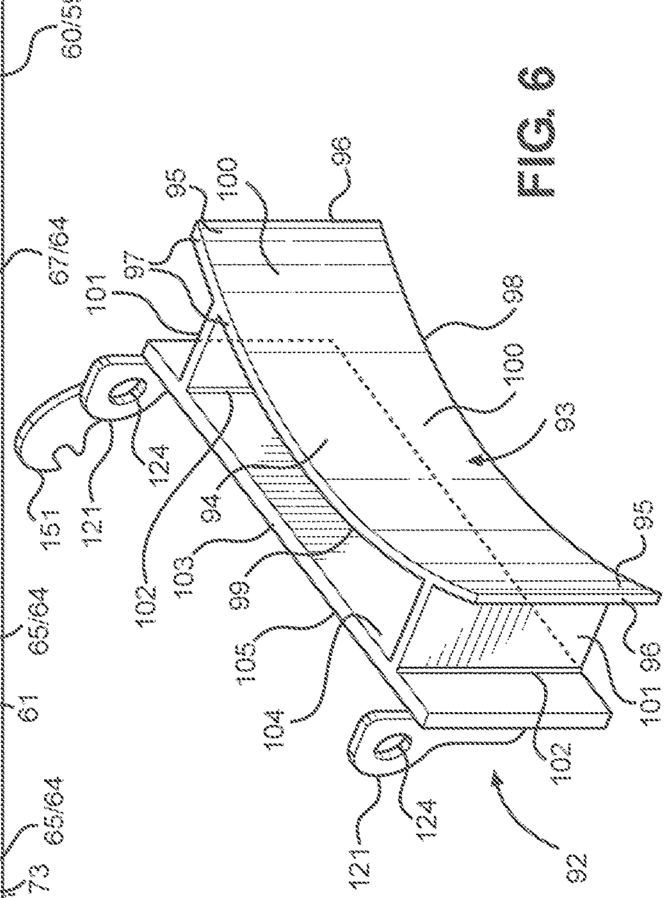
FIG. 6 is a perspective view of a mulch gate, made in accordance with principles of the disclosed subject matter.
Figure 8:
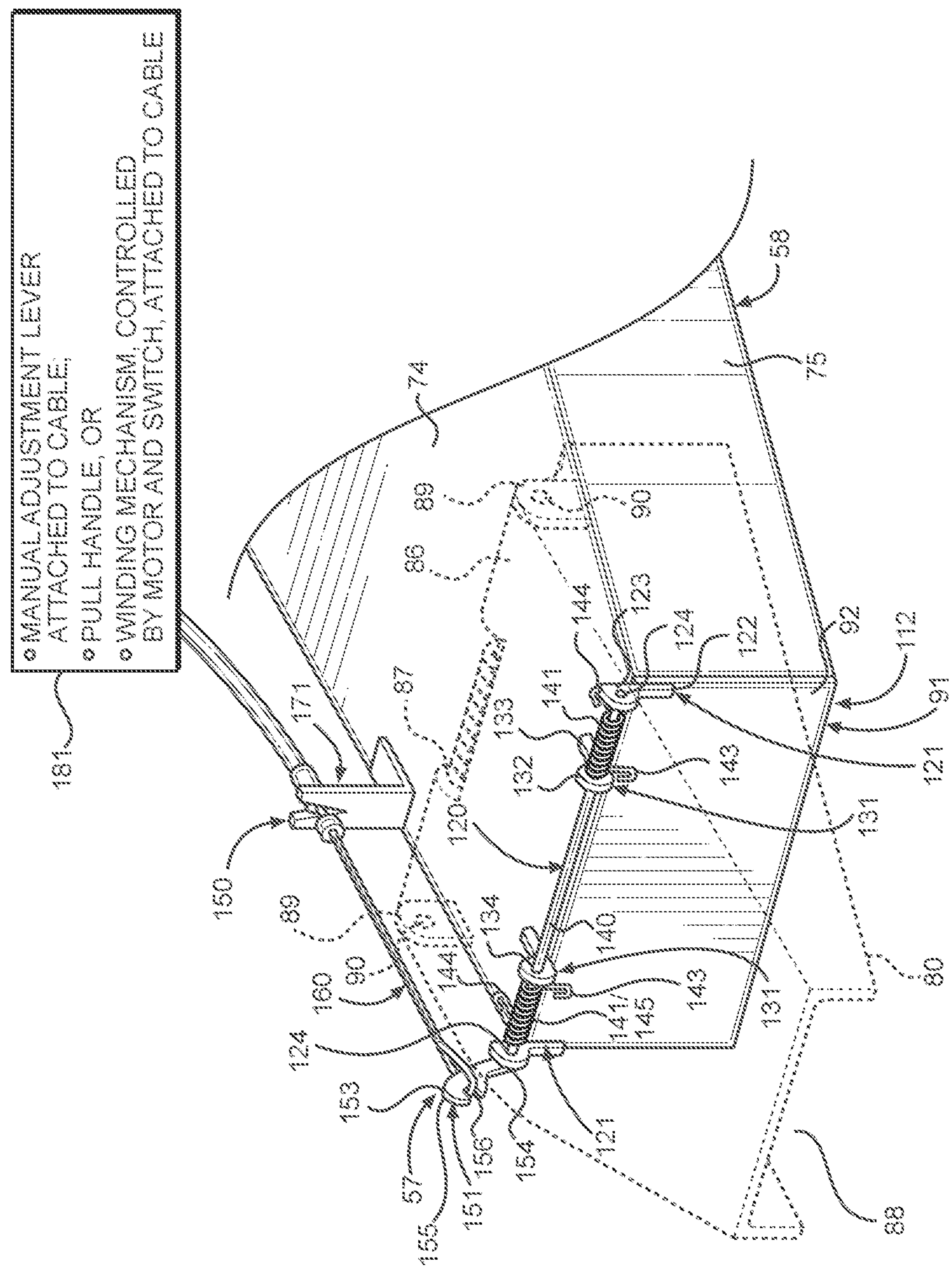
FIG. 8 is a partial perspective view of the cutter housing assembly, with mulch gate closed and side discharge guard chute in phantom, as shown in FIG. 7.
Figure 9:
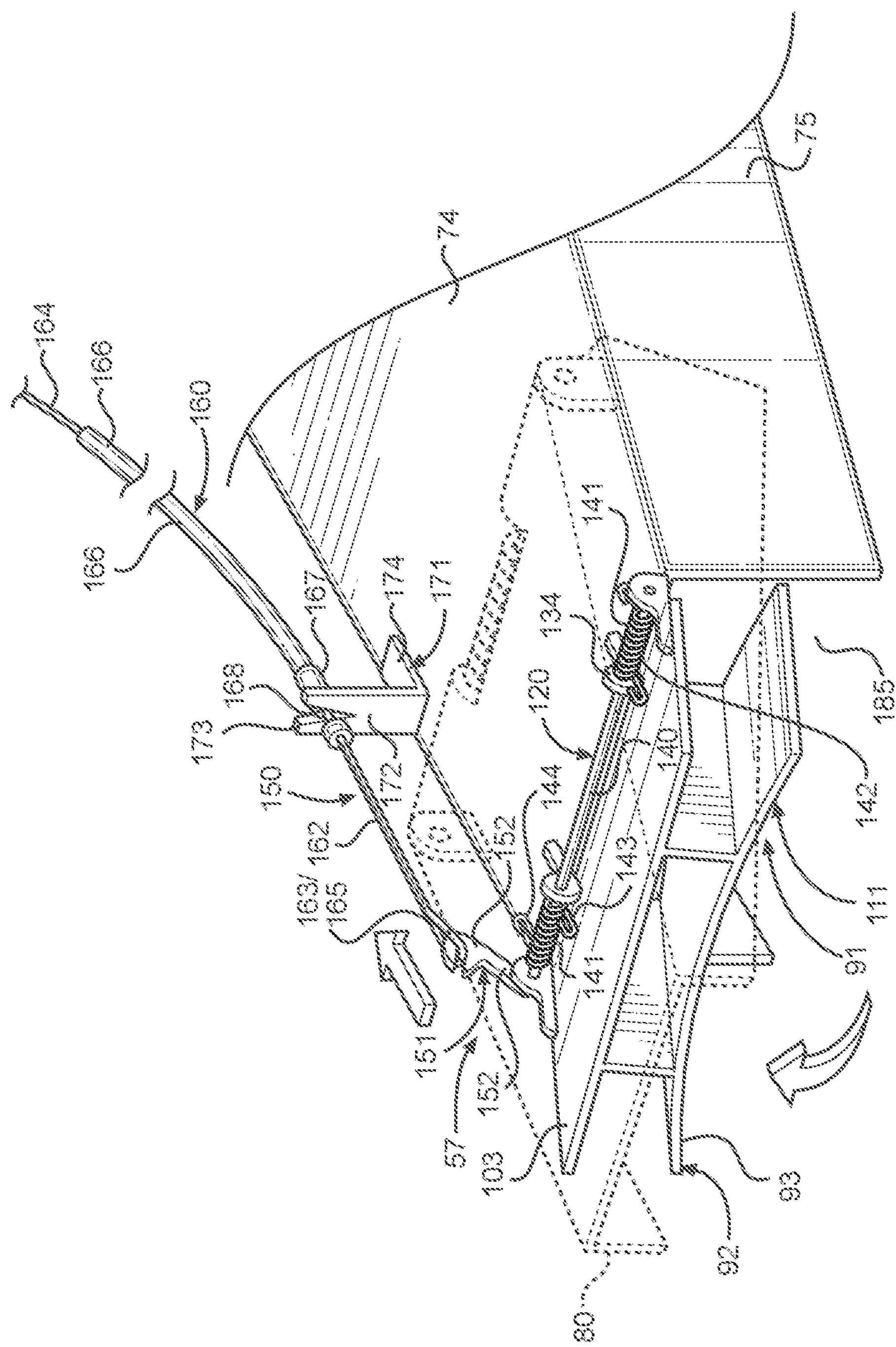
FIG. 9 is a partial perspective view of the cutter housing assembly, with mulch gate open and side discharge guard chute in phantom, as shown in FIG. 7.

Referring to FIGS. 6, 8 and 9 collectively, the cutter housing assembly 57 can include a gate assembly 91 having mulch gate 92. The mulch gate 92 can include both a scroll plate 93 and a support plate 103. The scroll plate 93 can have an interior scroll-shaped face 100 that includes a curved face that is concave from a perspective of view located inside the first cutting chamber 61.

For example, first chamber wall 65 (and/or wall surface 73) can be an arcuate wall/wall surface that extends along a circular arc. The scroll plate 93 can be an arcuate plate that also extends along a circular arc that corresponds to the circular arc of the first chamber wall 65. That is, the scroll plate 93 can have a radius of curvature that is substantially equal to the radius of curvature of the first chamber wall 65 such that an observer can perceive the scroll plate 93 as completing the first chamber wall 65. Moreover, both the scroll plate 93 and the first chamber wall 65 can be semi-circular and have coincident centers located at an axis of rotation of a cutting blade located in the first chamber. It is also noted that only the wall interior surface 73 and interior scroll-shaped face 100 can be configured as portions of a circle that are concentric and have the same radius (such that they surface 73 and face 100 complement and are continuous with each other to complete a full circle), The mulch gate 92 can be pivotably or rotatably attached to the cutter housing 58 so as to be movable between an opened gate position 111 (FIG. 9) and a closed gate position 112 (FIG. 8). In the opened gate position 111, the mulch gate 92 is positioned such that the discharge opening 71 is open and free to discharge clippings. In the closed gate position 112, the mulch gate 92 is positioned such that the mulch gate 92 closes the discharge opening 71 so as to provide a mulch mode. In the opened gate position, the discharge opening 71 can be opened so as to allow cut vegetation, such as lawn clippings, to pass out of the discharge opening 71 and onto the particular lawn or terrain, for example. In the closed gate position, in which the mulch gate is positioned to close the discharge opening 71, the interior scroll-shaped face 100 of the mulch gate 92 can be disposed so as to be continuous with the wall interior surface 73 of the first chamber wall 65.

Referring to FIGS. 7-9, the cutter housing assembly 57 can also include a side discharge guard chute 80 that can be pivotally attached to top wall 74 of the cutter housing 58. The gate assembly 91 can be positioned underneath the side discharge guard chute 80 so as to be hidden underneath the side discharge guard chute 80.

As shown in FIG. 7, the side discharge guard chute 80 can include a guard top wall 81 and guard sidewalls 82. The guard sidewalls 82 can be attached along opposing edges of the guard top wall 81. The guard top wall 81 and guard sidewalls 82 can collectively form a channel 88, which is open toward the ground. The channel 88 can be configured such that cut vegetation, such as lawn clippings, can pass therethrough and be directed downwards. The side discharge guard chute 80 can be pivotally attached to the cutter housing 58 by a guard pivot pin 84. In the depicted example, the side discharge guard chute 80 includes hinge portions 86 with a respective pin receiving bore 87. The guard pivot pin 84 can be received into the pin receiving bores 87 of each hinge portion 86.

As shown in FIG. 8, in phantom, the cutter housing 58 can include one or more guard hinge brackets 89. Each of the guard hinge brackets 89 can include pin receiving holes 90.

The guard pivot pin 84 can be received into the pin receiving holes 90. Accordingly, the guard pivot pin 84 can be pivotally supported upon the cutter housing 58. In turn, the guard pivot pin 84 can support the side discharge guard chute 80. Additionally, a return spring 83 can be provided to bias the side discharge guard chute 80 to a closed position, i.e. the closed position being illustrated in FIG. 7 in contrast to an open or partially opened position or disposition as shown in FIG. 9. The return spring 83 can encompass or be positioned around the guard pivot pin 84. The return spring 83 can include opposing ends that respectively engage the top wall 74 of the cutter housing 58 and the side discharge chute 80 so as to provide the biasing of the side discharge guard chute to the closed position. The pivotal travel or movement of the side discharge guard chute 80 can be limited or controlled by suitable stops provided on the side discharge guard chute 80 and/or the cutter housing 58. The return spring 83 can be a coil spring wrapped about the guard pivot pin 84, or can be another type of biasing device and/or separately disposed from the guard pivot pin 84.

Referring to FIGS. 7-9, the cutter housing assembly 57 can also include an actuator 150. The actuator 150 can be provided and operatively connected to the mulch gate 92 so as to move the mulch gate 92 between the opened gate position 111 and the closed gate position 112. The actuator 150 can include a lever 151, a cable assembly 160, and an adjustment mechanism 181. The lever 151, as shown in FIGS. 6-9, can be welded and/or attached by mechanical fastener to a first gate hinge support 125. Alternatively, the lever 151 can be integrally formed with the first gate hinge support 125. Also, the lever 151 and the first hinge support 125 can be separate structures, as described further below.

As shown in FIG. 6 and FIG. 9, the mulch gate 92 can include a scroll plate 93, as described above, as well as a support plate 103. The scroll plate 93 can be provided with the interior scroll-shaped face 100. The scroll plate 93 can be attached to the support plate 103 by at least one connection member 101. In the exemplary embodiment of FIGS. 6 and 9, the mulch gate 92 can include a pair of connection members 101. However, the mulch gate 92 can include any appropriate number of connection members 101 ribs or the like to form the necessary geometric configuration for the mulch gate 93 for a given application. The connection members 101 can extend between the scroll plate 93 and support plate 103. The connection members 101 can be configured as plates, webs, ribs, or other similar structures that extend between the scroll plate 93 and the support plate 103 to maintain a predetermined spatial relationship between the scroll plate 93 and the support plate 103. In the exemplary embodiment of FIGS. 6 and 9, each connection member 101 can be in the form of a metal plate such as but not limited to a steel plate. Each connection member 101 can be welded on opposing ends, respectively, to the scroll plate 93 and the support plate 103, such as at weld joints 102. The scroll plate 93, support plate 103, and flanges 101 can be integrally formed.

As described above, the scroll plate 93 can be provided with an arcuate shape and include an interior scroll-shaped face 100. Referring to FIG. 6, the scroll plate 93 can include a scroll center portion 94. Scroll side portions 95 can be provided on opposing ends or sides of the scroll center portion 94. The connection members 101 can demarcate the scroll center portion 94 relative to the scroll side portions 95. The scroll plate 93, and more specifically each of the scroll side portions 95, can include side edges 96. The scroll plate 93 can include an upper edge 97 and a lower edge 98. The scroll plate 93 can also include a scroll outer side 99, i.e., an outboard side of the scroll plate 93. In other words, one side of the scroll plate 93 is the inboard interior scroll-shaped face 100 and the other side of the scroll plate 93 is the scroll outer side 99. Accordingly, the two connection members 101 can be provided on opposing sides of the mulch gate 92 and extend between the scroll plate 93 and the support plate 103 so as to maintain the scroll plate 93 and the support plate 103 in a spaced relationship.

The cutter housing 58 can include a housing opening 185 that extends from the front wall 75 to the rear side wall 60. The discharge opening 71 can be spaced away from and extend along at least a portion of the housing opening 185. The support plate 103 can be configured to close the housing opening 185 when the mulch gate 92 is in the gate closed position 112. The support plate 103 can be configured to abut each of the front wall 75 and the rear side wall 60 when the mulch gate 92 is in the gate closed position 112. The support plate 103 can include a plate interior side 104 and a plate outer side 105. The plate interior side 104 can be attached to, welded to, or integrally formed with the connection member or flanges 101. The support plate 103 can be flat or planar, in contrast to the curved structure of the scroll plate 93. The flat structure of the support plate 103 can be conducive to the pivotably attached arrangement of the mulch gate with the cutter housing 58. The curved or concave structure of the scroll plate 93 can be conducive to providing a smooth, contiguous, continuous interior surface of the cutting chamber or chambers when the mulch gate 92 is closed, i.e., so as to provide a mulching or mulch mode. In particular, the scroll plate 93 can be formed as a part of a circle (a circular arc in cross section), or part of a cylinder, that has a center axis shared with a center axis of the circular wall interior surface 73. For example, the shaft 77 that supports the blades 68 can rotate about an axis that forms the shared axis about which the scroll plate 93 and wall interior surface 73 are formed such that they provide the continuous curved inner surface conducive to efficient mulching. Alternatively, the underside of the machine can include scroll plate 93 and wall interior surface 73 that together form a continuous elliptical surface for mulching performance. In this case, the elliptical shape can be in reference to a shared axis as well, and the walls can form a substantially continuous smooth arc in a cylindrical form.

The gate assembly 91 can be pivotally connected to the cutter housing 58 in any appropriate manner such as but not limited to at least one hinge. The hinge can be any appropriate hinge such as but not limited to a leaf hinge, a strap hinge, a spring-biased hinge, a living hinge, etc. For example, referring to FIGS. 8 and 9, the gate assembly 91 can include a hinge 120 (also referred to as a mulch gate hinge). The hinge 120 can include one or more gate hinge supports 121, one or more housing hinge supports 131, and a pin 140. In the exemplary embodiment of FIGS. 6-9, the hinge 120 can include a pair of gate hinge supports 121 and a pair of housing hinge supports 131. The gate hinge supports 121 can be spaced away from each other. The housing hinge supports 131 can be spaced away from each other and spaced away from each of the gate hinge supports 121. However, alternate embodiments can include at least one gate hinge support 121 abutting at least one gate hinge support 131. Further, the exemplary embodiment of FIGS. 6-9 shows the housing hinge supports 131 located between the gate hinge supports 121. However, alternate embodiments can include the gate hinge supports 121 located between the housing hinge supports 131. Alternate embodiments can include the gate hinge support 121 and the housing hinge supports 131 alternately arranged along the length of the pin 140.

Each of the gate hinge supports 121 can include an attachment portion 122 and an end portion 123. The attachment portion 122 can be attached to the support plate 103, of the mulch gate 92, by welding or mechanical fastener, for example. Alternatively, the gate hinge support 121 can be integrally formed with the support plate 103. The end portion 123 can extend away from the support plate 103. A pin receiving bore 124 can be provided in the end portion 123. The pin receiving bore 124 can receive the pin 140.

Each of the housing hinge supports 131 can include an attachment portion 132 and an end portion 133. The attachment portion 132 can be attached to the top wall 74 of the cutter housing 58 at or about the discharge opening 71. The attachment portion 132, of the housing hinge support 131, can be attached to the cutter housing 58 by welding or mechanical fastener, for example. Alternatively, the housing hinge support 131 can be integrally formed with the cutter housing 58. The end portion 133 can extend away from the top wall 74. A pin receiving bore 134 can be provided in the end portion 133 of the housing hinge support 131. The pin receiving bore 134 also can receive the pin 140. That is, the pin 140 can connect each of the housing hinge supports 131 to the gate supports 121. The mulch gate 92 can pivot about the pin 140 as the mulch gate 92 pivots between the opened gate position 111 and the closed gate position The lever 151 can be attached to either of the gate hinge supports 121. Such attachment of the lever 151 can be provided through welding or mechanical fastener. The lever 151 can be integrally formed with either of the gate hinge supports 121. However, alternate embodiments can include the lever 151 connected to the mulch gate at a location that is spaced away from each of the gate hinge supports 121.

The hinge 120 can include one or more return springs 141 so as to bias the mulch gate 92 to the closed gate position 112. In the exemplary embodiment of FIGS. 8 and 9, the hinge 120 includes a pair of return springs 141. The return springs 141 can be any appropriate spring such as but not limited to a coil spring or helical spring or other similar mechanical device. The return springs 141 can include a gate engagement end 143 and a cutter housing engagement end 144. The gate engagement end 143 can be positioned against and/or attached to mulch gate 92. The cutter housing engagement end 144 can be positioned against and/or attached to the cutter housing 58. Each return spring 141 can be positioned around the pin 140 with ends 143, 144 positioned so as to provide a closing force to the mulch gate 92 relative to the cutter housing 58 when the mulch gate 92 is displaced from and in the closed gate position 112. In other words, each of the return springs 141 can be in a pre-loaded state so as to apply the return force on the mulch gate 92 even when the mulch gate is in the closed gate position 112. Each of the gate engagement ends 143 can lay or be positioned against the mulch gate 92 and/or be affixed or engaged with the mulch gate 92, such as being received into a securement aperture or slot, for example. Each of the cutter housing engagement ends 144 can lay or be positioned against the cutter housing 58 and/or be affixed or engaged with the cutter housing 58, such as being received into a securement aperture or slot, for example.

Each of the return springs 141 can be disposed about the pin 140 and between a respective pair of a gate hinge support 121 and a housing hinge support 131. Embodiments of the disclosure are not limited to using a return spring 141 to bias the mulch gate 92 to a closed or closed gate position 112. Other biasing mechanisms or arrangements can be utilized.

The cutter housing assembly 57 can include an actuator 150 to move the mulch gate 92 from the closed gate position 112 (mulch mode) to the opened gate position 111 (discharge mode). The actuator 150 can also move the mulch gate 92 from the opened gate position 111 (discharge mode) to the closed gate position 112 (mulch mode). As described above, the actuator 150 can include a lever 151 that is provided to move the mulch gate 92 between the open gate position 111 and the closed gate position 112. Referring to FIGS. 8 and 9 collectively, the actuator 150 can include a cable assembly 160, with cable 162, and an adjustment mechanism 181. The cable 162 can include a first location 163 on the cable and a second location 164 on the cable. The cable 162 can be connected to the lever 151 at the first location 163 of the cable 162. The second location 164, of the cable 162, can be attached to the adjustment mechanism 181. The first location 163 of the cable 162 can be a first end of the cable. The second location 164 of the cable 162 can be a second end of the cable. The adjustment mechanism 181 can be configured to actuate the cable 162 so as to move the mulch gate 92 from the closed gate position 112 to the opened gate position 111, as well as from the opened gate position 111 to the closed gate position 112.

The adjustment mechanism 181 can be a manual adjustment lever that is operable by the user, such as a manual adjustment lever that is pivotably attached to the frame of the particular lawnmower at some accessible location, i.e. such that the operator of the lawnmower can access and manipulate the manual adjustment lever. For example, the lever can be pivotally mounted on the steering handle 13 of the exemplary lawnmower 11 of FIG. 1, or pivotally mounted on the body 44 of the exemplary lawnmower 30 of FIG. 3 at a location that is adjacent to the steering wheel 33 or above one of the rear wheels 36. The manual adjustment lever can be operable between (a) a first lever position that corresponds to the mulch gate 92 being in the opened gate position 111, and (b) a second lever position that corresponds to the mulch gate 92 being in the closed gate position 112. The manual adjustment lever can be configured to resist displacement from a first lever position to a second lever position, which corresponds to resisting displacement from the opened gate position to the closed gate position.

In another embodiment, the adjustment mechanism 181 can be in the form of or include a pull handle 182 as shown in FIG. 8. In other embodiments, the adjustment mechanism 181 can include a winding mechanism around which the cable 162 is selectively wound so as to adjust an operating length of the cable. In other words, the cable 162 can be selectively wound and un-wound so as to vary or adjust an operating length of the cable 162. The operating length of the cable 162 can control whether the gate 92 is in the opened gate position or the closed gate position. The winding mechanism can be controlled by a motor, such as an electric motor. In turn, the electric motor can be controlled by the operator by actuating a switch, for example, that controls a supply of power to the electric mower.

As described above, and shown in FIGS. 6-9, a lever 151 can be provided to apply physical force to the mulch gate 92 so as to pivot the mulch gate 92 from a closed gate position 112 to an opened gate position 111. The lever 151 can be mechanically attached to the first gate hinge support 125 and/or the second gate hinge support 127. The lever 151 can be integrally formed with the first gate hinge support 125 and/or the second gate hinge support 127. The lever 151 can be mechanically attached to the plate outer side 105 of the support plate 103. Additionally, the lever 151 can be integrally formed with the support plate 103.

Referring to FIGS. 8 and 9 collectively, the lever 151 can include a lever arm 152. The lever arm 152 can include an effort end or portion 153 and a resistance end or portion 154. The effort end 153 can include an attachment element 155. The attachment element 155 can include a groove, slot or aperture 156 into which a first end 163 of the cable 162 is attached. The resistance end 154 can be attached to or integrally formed with one of the gate hinge supports 121. The resistance end 154 can be attached to or integrally formed with the support plate 103 (of the mulch gate 92). In operation, a lever force can be applied to the effort end 153 of the lever 151 so as to effect pivoting of mulch gate 92 about the pin 140.

As described above, the cable 162 can be part of a cable assembly 160. The cable 162 can include first end 163. The first end 163 can be attached to and/or positioned within the slot 156 of the attachment element 155 of the lever 151. For example, the first end 163 can include a cable attachment loop or other element 165 that engages with the attachment element 155. The cable assembly 160 can include a cable sheath 166. The cable sheath 166 can include a grooved ferrule or cable stop 167. The cable stop 167 can include an annular groove 168. The annular groove 168 can be received into, so as to be attached to and supported by, a housing cable bracket 171.

The housing cable bracket 171 can include a bracket body 172. The bracket body 172 can include a slot or groove 173. The housing cable bracket 171 can also include an attachment tab or mount 174 that is provided at a lower end of the bracket body 172. The attachment tab 174 can be welded, attached by mechanical fastener, or otherwise secured upon the top wall 74 of the cutter housing 58. The cable stop 167, at the annular groove 168, can be received into the slot 173 so as to secure the cable stop 167, along with the attached cable housing 166, to the housing cable bracket 171. The cable 162 can be slidably disposed within the cable housing 166. The cable housing 166 can be of a length as desired and an end of the cable housing 166 can be positioned at a location as desired. The cable housing 166 can be otherwise secured to the lawnmower frame 39 or body 44 or other structure so as to maintain the cable housing 166 in a static disposition, i.e., such that cable 162 can be slidably manipulated within the housing 166 in a controlled manner. Illustratively, as described above, the second end or location 164 of the cable 162 can be provided with an adjustment mechanism 181, that can include a pull handle, manual adjustment lever, cable winding mechanism, and/or other mechanical arrangement so as to selectively adjust the operative length of the cable 162 between the housing cable bracket 171 and the lever 151. As should be appreciated, adjustment of the operative length of the cable 162 between the housing cable bracket 171 and the lever 151 corresponds to adjustment of the mulch gate 92 between an open gate position 111 and a closed gate position 112.

As shown in FIG. 8, for example, and described above, the cutter housing assembly 57 of the disclosure can include the mulch gate 92 and the side discharge guard chute 80. Both the mulch gate 92 and the side discharge guard chute 80 are pivotally attached to the cutter housing 58 at respective locations. In order to accommodate operation of the mulch gate 92 in conjunction with operation of the side discharge guard chute 80, i.e. guard chute 80, the guard chute 80 can be provided with a slot or opening that extends up from a lower edge 85 of the rearward guard sidewall 82. Such slot or opening can be sized, dimension, and positioned such that operation of the guard chute 80 is provided for in conjunction with operation of the mulch gate 92.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the cutter deck or the mulch gate 92.

While the subject matter has been described in detail with reference to exemplary embodiments thereof, it will be apparent to one skilled in the art that various changes can be made, and equivalents employed, without departing from the scope of the disclosure.

Although the mulch gate 92 has been described as having an opened gate position 111 and a closed gate position 112, the mulch gate 92 can include one or more intermediate positions between the opened gate position 111 and a closed gate position 112. In such intermediate positions, the mulch gate 92 can partially block the discharge opening 71. As a result, a partial mulch mode can be attained, or in other words a partial discharge mode can be attained in which each intermediate position(s) can provide a corresponding amount of mulched vegetation and discharged vegetation.

For example, embodiments are disclosed above in which gate hinge support 121 or portions thereof is constructed of a single or unitary piece. However, embodiments are intended to include or otherwise cover a gate hinge support 121 that includes or is constructed of multiple pieces. For example, the multiple pieces of gate hinge support 121 can be injection molded in pieces and then connected together such as but not limited to heat bonding or adhesive or mechanical fasteners, for example.

For example, embodiments are disclosed above in which housing hinge support 131 or portions thereof is constructed of a single or unitary piece. However, embodiments are intended to include or otherwise cover a housing hinge support 131 that includes or is constructed of multiple pieces. For example, the multiple pieces of housing hinge support 131 can be injection molded in pieces and then connected together such as but not limited to heat bonding or adhesive or mechanical fasteners, for example.

Exemplary embodiments are disclosed above in which the scroll plate 93 and the support plate 103 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly is intended to be utilized.

In the exemplary cutter housings disclosed above, a single blade can be mounted on each shaft that is driven by the prime mover. Alternate embodiments can include two blades mounted on each shaft that is driven by the prime mover. For example, a first blade can be stacked above a second blade on the same shaft. The first blade can be rotationally offset with respect to the second blade such that the cutting edge of the first blade is in front of the cutting edge of the second blade with respect to the rotational direction of blades.

The exemplary embodiment of the cutter housing 58 of FIG. 5 shows a symmetrical asynchronous layout for the blades 68, 69, 70 with the center blade offset in a forward direction with respect to the travel direction of the lawnmower 30 and the outboard blades 68, 70 aligned in a transverse direction of the lawnmower 30. However, alternate embodiments can include other asynchronous layouts. For example the center blade 69 can be offset rearwardly with respect to the outboard blades 68, 70. In another exemplary embodiment, the center blade 69 can be offset rearwardly with respect to one of the outboard blades 68, 70, and the other of the outboard blades 68, 70 can be offset rearwardly with respect to each of the center blade 69 and the one of the outboard blades 68, 70.

In the exemplary embodiments of FIGS. 4 and 5, the first blade 40 can be the same size as the second blade 41, and the first, second and third blades 68, 69, 70 can be the same size. However, in alternate embodiments, the first blade 40 can be longer or shorter than the second blade 41, and at least one of the blades 68, 69, 70 can be longer or shorter than another one of the blades 68, 69, 70.

What is claimed is:

1. A cutter housing assembly for a lawnmower comprising:

a cutter housing that includes a chamber wall, a discharge opening, and a front wall that is spaced away from the chamber wall, the chamber wall includes a wall interior surface, the front wall terminates at a bottom edge; and a gate assembly that includes a support plate and a scroll plate connected to the support plate, the support plate includes a bottom edge, the scroll plate is provided with an interior scroll-shaped face, the gate assembly is pivotably attached to the cutter housing so as to be movable between (a) an opened gate position in which the scroll plate is positioned such that the discharge opening is opened, and (b) a closed gate position in which the scroll plate is positioned such that the scroll plate closes the discharge opening to provide a mulch mode, and when the scroll plate is in the closed gate position, the interior scroll-shaped face of the mulch gate is continuous with the wall interior surface of the chamber wall, the bottom edge of the support plate is aligned with the bottom edge of the front wall when the scroll plate is in the closed gate position, and the support plate is spaced away from the discharge opening when the scroll plate is in each of the opened gate position and the closed gate position.

2. The cutter housing assembly of claim 1, wherein the wall interior surface of the cutter housing is configured as a semicircle about a first housing axis, and the gate assembly is rotatably attached to the cutter housing by a hinge having a hinge axis such that the gate assembly rotates about the hinge axis, and the hinge axis is substantially perpendicular with respect to the housing axis.

3. The cutter housing assembly of claim 1, wherein the cutter housing is configured to house a cutting blade that rotates about a blade axis, and the support plate is rotatably attached to the cutter housing by a hinge having a hinge axis such that the support plate rotates about the hinge axis, and the hinge axis is substantially perpendicular with respect to the blade axis.

4. The cutter housing assembly of claim 1, wherein the interior scroll-shaped face of the scroll plate is semicircular about a first axis, and the wall interior surface of the chamber wall is also semicircular about the first axis such that when the scroll plate is in the mulch mode and in a closed position, the interior scroll-shaped face and the wall interior surface form a substantially continuous and cylindrical surface.

5. The cutter housing assembly of claim 1, further comprising a side discharge guard chute that is pivotably attached to the cutter housing adjacent to the discharge opening, and the gate assembly is positioned underneath the side discharge guard chute so as to be hidden underneath the side discharge guard chute.

6. The cutter housing assembly of claim 1, further comprising an actuator configured to be controlled by a user and operatively connected to the mulch gate to move the scroll plate between the opened gate position and the closed gate position.

7. The cutter housing assembly of claim 6, wherein the actuator includes a lever attached to the gate assembly, and the lever is configured to move the scroll plate between the opened gate position and the closed gate position.

8. The cutter housing assembly of claim 7, wherein the actuator includes:

an adjustment mechanism that is configured to be mounted on the lawnmower at a location that is spaced away from the cutter housing, and a cable with a first end and a second end, the first end of the cable is connected to the lever, the second end of the cable is attached to the adjustment mechanism, and the adjustment mechanism is configured to actuate the cable so as to move the scroll plate between the opened gate position and the closed gate position.

9. The cutter housing assembly of claim 1, wherein the scroll plate is attached to the support plate by at least one connection member.

10. The cutter housing assembly of claim 9, wherein the at least one connection member includes a pair of connection members, with one of the pair of connection members located on one side of the gate assembly and another of the pair of connection members located on an opposing side of the gate assembly, and the pair of connection members extending between the scroll plate and the support plate so as to maintain the scroll plate and the support plate in a spaced relationship.

11. The cutter housing assembly of claim 1, wherein the scroll plate is an arcuate plate.

12. The cutter housing assembly of claim 11, wherein the support plate is spaced away from the scroll plate; and a pair of connection members are connected to and extend between the scroll plate and the support plate.

13. The cutter housing assembly of claim 1, wherein the scroll plate is spaced from the support plate, the cutter housing further includes a housing opening that is spaced away from the discharge opening, and the support plate is configured to close the housing opening when the scroll plate is in the closed gate position.

14. The cutter housing assembly of claim 1, wherein the gate assembly further includes at least one return spring that biases the scroll plate to the closed gate position.

15. A cutter housing assembly for a lawnmower comprising:

a cutter housing that includes at least one cutting chamber, a chamber wall extending along the cutting chamber, a front wall spaced away from the chamber wall, a rear wall, a housing opening extending from the front wall to the rear wall, and a discharge opening in the chamber wall, the chamber wall having an arcuate shape, the chamber wall is located between the front wall and the rear wall;

at least one blade rotatably supported in the cutting chamber about a blade axis; and a gate assembly that includes a scroll plate configured to selectively open and close the discharge opening, a support plate connected to the scroll plate such that the support plate is spaced away from and overlaps the scroll plate, the gate assembly is pivotably attached to the cutter housing so as to move the scroll plate between (a) an opened gate position in which the scroll plate is positioned such that the discharge opening is opened, and (b) a closed gate position in which the scroll plate is positioned such that the scroll plate closes the discharge opening to provide a mulch mode, the scroll plate includes a scroll wall that has an arcuate shape such that the scroll wall is substantially continuous with the chamber wall when the scroll plate is in the closed gate position, and the support plate extends from the front wall to the rear wall and closes the housing opening when the scroll plate is in the gate closed position.

16. The cutter housing assembly of claim 15, wherein the chamber wall is semicircular about the blade axis and the scroll wall is semicircular about the blade axis when the scroll plate is in the closed position.

17. The cutter housing assembly of claim 15, wherein both an interior surface of the chamber wall and an interior surface of the scroll wall are located at a same radius about a shared axis and extend about a same continuous arcuate path to define a substantially elliptical cylindrical surface about the shared axis when the scroll plate is in the closed position.

18. The cutter housing assembly of claim 15, wherein the cutter housing includes a second cutting chamber having an opening to the at least one cutting chamber such that clippings travel from the second cutting chamber to the at least one cutting chamber when the scroll plate is in the opened gate position.

19. The cutter housing assembly of claim 15, wherein the cutter housing includes a housing hinge support, the gate assembly further includes a housing hinge support connected to and abutting the support plate, a pin passing through the housing hinge support and the cutter hinge support such that the gate assembly is configured to rotate about a hinge axis of the pin and relative to the cutter housing, and a lever directly connected to one of the housing hinge support and the support plate, and the hinge axis and blade axis are substantially perpendicular.

20. A lawnmower comprising:

a cutter housing assembly that includes, a cutter housing that includes a chamber wall with a wall interior surface including a discharge opening;

at least one blade located in the cutter housing and configured to rotate within the cutter housing about a blade axis; and a gate assembly that includes a mulch gate having an interior scroll-shaped face, the mulch gate pivotably attached to the cutter housing so as to be movable between (a) an opened gate position in which the mulch gate is positioned such that the discharge opening is opened, and (b) a closed gate position in which the mulch gate is positioned such that the mulch gate closes the discharge opening to provide a mulch mode, wherein in the closed gate position, the interior scroll-shaped face of the mulch gate is continuous with the wall interior surface of the chamber wall such that clippings remain in the cutter housing and are not discharged via the discharge opening, the mulch gate further includes a gate plate, and a scroll plate that defines the scroll-shaped face and is spaced from the gate plate, the cutter housing further includes a housing opening that is spaced away from the discharge opening, the gate plate is configured to close the housing opening when the mulch gate is in the closed gate position, and the scroll plate is configured to close the discharge opening when the mulch gate is in the closed gate position.

* * * * *